United States Patent
Thore

(10) Patent No.: US 10,254,441 B2
(45) Date of Patent: Apr. 9, 2019

(54) METHOD OF MODELLING A SUBSURFACE VOLUME

(71) Applicant: Total S.A., Paris (FR)

(72) Inventor: Pierre Daniel Thore, Aberdeen (GB)

(73) Assignee: Total S.A., Paris (FR)

( * ) Notice: Subject to any disclaimer, the term of this patent is extended or adjusted under 35 U.S.C. 154(b) by 539 days.

(21) Appl. No.: 14/780,582

(22) PCT Filed: Mar. 18, 2014

(86) PCT No.: PCT/EP2014/055452
§ 371 (c)(1),
(2) Date: Sep. 28, 2015

(87) PCT Pub. No.: WO2014/154538
PCT Pub. Date: Oct. 2, 2014

(65) Prior Publication Data
US 2016/0054472 A1    Feb. 25, 2016

(30) Foreign Application Priority Data
Mar. 28, 2013    (GB) .................................. 1305705.4

(51) Int. Cl.
*G01V 11/00* (2006.01)
*G01V 99/00* (2009.01)

(52) U.S. Cl.
CPC ............. *G01V 11/00* (2013.01); *G01V 99/005* (2013.01); *G01V 2210/614* (2013.01)

(58) Field of Classification Search
CPC .............................. G01V 11/00; G01V 99/005
(Continued)

(56) References Cited

U.S. PATENT DOCUMENTS 5,838,634 A * 11/1998 Jones ...................... G01V 1/282
367/73
6,106,561 A * 8/2000 Farmer .................. G01V 1/282
345/423
(Continued)

FOREIGN PATENT DOCUMENTS

| EP | 1533754 A1 | 5/2005 |
|---|---|---|
| GB | 2421822 A | 7/2006 |
| WO | WO9738330 | 10/1997 |

OTHER PUBLICATIONS

International Search Report and Written Opinion for PCT/EP2014/055452 dated Jun. 25, 2014.
(Continued)

*Primary Examiner* — Kamini S Shah
*Assistant Examiner* — Iftekhar A Khan
(74) *Attorney, Agent, or Firm* — Abel Law Group, LLP

(57) ABSTRACT

Disclosed is a method of modelling a subsurface volume, and a corresponding computer program and apparatus. The method comprises defining a regular planar grid of regularly arranged locations in the two dimensions substantially parallel to the surface, and calculating a plurality of one dimensional arrays, each one dimensional array extending from a different one of the regularly arranged locations, in the direction from surface to subsurface. Each of the one dimensional arrays comprises a plurality of one dimensional cells, wherein the cells are delineated according to actual geological features of the subsurface volume.

21 Claims, 4 Drawing Sheets

(58) Field of Classification Search
USPC .......................................................... 703/10
See application file for complete search history.

(56) References Cited

U.S. PATENT DOCUMENTS

| | | | | |
|---|---|---|---|---|
| 7,123,258 | B2* | 10/2006 | Deny | G01V 1/282 345/423 |
| 7,248,259 | B2* | 7/2007 | Fremming | G01V 1/30 345/420 |
| 7,603,265 | B2* | 10/2009 | Mainguy | G01V 1/282 702/13 |
| 7,706,981 | B2* | 4/2010 | Wilkinson | E21B 49/00 702/14 |
| 8,743,115 | B1* | 6/2014 | Mallet | G01V 1/302 345/424 |
| 9,058,445 | B2* | 6/2015 | Usadi | G06F 17/5009 |
| 9,418,182 | B2* | 8/2016 | Mallet | G06F 17/5009 |
| 9,477,010 | B2* | 10/2016 | Mallet | G01V 99/005 |
| 9,690,001 | B2* | 6/2017 | Thore | G01V 1/306 |
| 9,759,826 | B2* | 9/2017 | Mallet | G01V 1/302 |
| 2003/0216897 | A1* | 11/2003 | Endres | G01V 11/00 703/10 |
| 2006/0136162 | A1 | 6/2006 | Hamman et al. | |
| 2006/0235667 | A1* | 10/2006 | Fung | E21B 49/00 703/10 |
| 2007/0073527 | A1* | 3/2007 | Flandrin | G06T 17/20 703/10 |
| 2007/0219724 | A1* | 9/2007 | Li | G01V 1/282 702/12 |
| 2009/0248374 | A1* | 10/2009 | Huang | E21B 43/00 703/2 |
| 2010/0138196 | A1* | 6/2010 | Hui | E21B 43/00 703/1 |
| 2010/0138202 | A1* | 6/2010 | Mallison | E21B 43/00 703/10 |
| 2010/0299125 | A1* | 11/2010 | Ding | E21B 43/12 703/10 |
| 2010/0312529 | A1* | 12/2010 | Souche | E21B 43/26 703/2 |
| 2011/0106507 | A1* | 5/2011 | Lepage | G01V 11/00 703/2 |
| 2011/0166843 | A1* | 7/2011 | Hsu | G01V 11/00 703/10 |
| 2011/0259598 | A1* | 10/2011 | Hilliard | G06T 17/20 166/369 |
| 2011/0310101 | A1* | 12/2011 | Prange | G01V 99/00 345/420 |
| 2012/0022837 | A1* | 1/2012 | Asbury | G06T 17/05 703/2 |
| 2012/0179436 | A1* | 7/2012 | Fung | E21B 49/00 703/2 |
| 2012/0215513 | A1* | 8/2012 | Branets | G01V 99/005 703/10 |
| 2012/0232871 | A1* | 9/2012 | Priezzhev | G01V 7/00 703/10 |
| 2013/0120379 | A1* | 5/2013 | Adair | G06T 19/00 345/420 |
| 2013/0166264 | A1* | 6/2013 | Usadi | G06F 17/5009 703/2 |
| 2013/0226540 | A1* | 8/2013 | Pita | G06F 17/5009 703/2 |
| 2013/0238297 | A1* | 9/2013 | Lepage | G01V 99/00 703/2 |
| 2013/0246031 | A1* | 9/2013 | Wu | G06T 17/05 703/10 |
| 2013/0275106 | A1* | 10/2013 | Li | G01V 11/00 703/10 |
| 2013/0345985 | A1* | 12/2013 | Priezzhev | G01V 1/32 702/14 |
| 2014/0136171 | A1* | 5/2014 | Sword, Jr. | G01V 11/00 703/10 |
| 2014/0222403 | A1* | 8/2014 | Lepage | G01V 99/005 703/6 |
| 2014/0236558 | A1* | 8/2014 | Maliassov | G01V 99/00 703/10 |
| 2015/0212231 | A1* | 7/2015 | Borouchaki | G06T 17/20 703/10 |
| 2015/0254567 | A1* | 9/2015 | Imhof | G01V 1/301 703/10 |
| 2016/0180582 | A1* | 6/2016 | Forge | G06T 17/20 345/423 |

OTHER PUBLICATIONS

Thore, Pierre. "Application of a grid-consistent inversion to a 4D reservoir model." Society of Exploration Geophysicists, vol. 30, Issue 11, pp. 1262-1271 (2011).

* cited by examiner

METHOD OF MODELLING A SUBSURFACE VOLUME

The present disclosure relates to methods of subsurface modelling and in particular to gridding techniques used in subsurface modelling.

Subsurface models may comprise, for example, reservoir flow, basin, and geo-mechanical models. These comprise gridded 3D representations of the physical space of the subsurface, which may be used as inputs to a simulator thereby allowing the prediction of a range of physical properties as a function of controlled or un-controlled boundary conditions.

In a subsurface model the reservoir may be represented by an array of discrete cells, delineated by a grid which may be regular or irregular. The array of cells is usually three-dimensional, although 1D and 2D models are sometimes used. Values for attributes such as porosity, permeability and water saturation are associated with each cell. The value of each attribute is implicitly deemed to apply uniformly throughout the volume of the reservoir represented by the cell.

A subsurface model may be described in terms of a seismic grid and a reservoir grid. The seismic grid tends to be a regular grid of relatively low resolution when compared to the reservoir grid. The reservoir grid is an irregular grid with grid boundaries defined, at least in part, by geologic features of the subsurface. Transferring information obtained at seismic scale to the reservoir grid is typically performed directly by a painting technique i.e. directly using geometry to correlate the position in the seismic dataset to the position in the reservoir grid It is desirable to improve on these gridding techniques.

SUMMARY OF INVENTION

In a first aspect of the invention there is provided a method of modelling a subsurface volume comprising: defining a regular planar grid comprising regularly arranged locations, in the two dimensions substantially parallel to the surface; calculating a plurality of one dimensional arrays, each one dimensional array extending from a different one of said regularly arranged locations, in the dimension substantially perpendicular to said planar grid; each of said one dimensional arrays comprising a plurality of one dimensional cells, wherein said cells are delineated according to actual geological features of the subsurface volume.

Other aspects of the invention comprise a computer program comprising computer readable instructions which, when run on suitable computer apparatus, cause the computer apparatus to perform the method of the first aspect; and an apparatus specifically adapted to carry out all the steps of any of the method of the first aspect.

Other non-essential features of the invention are as claimed in the appended dependent claims.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

A subsurface model may be described in terms of a seismic grid and a reservoir grid (and possibly also a geologic grid). The seismic grid is typically a uniform, regular grid (in x, y and z, where each seismic trace is in the z direction, i.e. from surface to subsurface) which divides the subsurface volume into a plurality of regularly sized and arranged cells.

Figure 1:
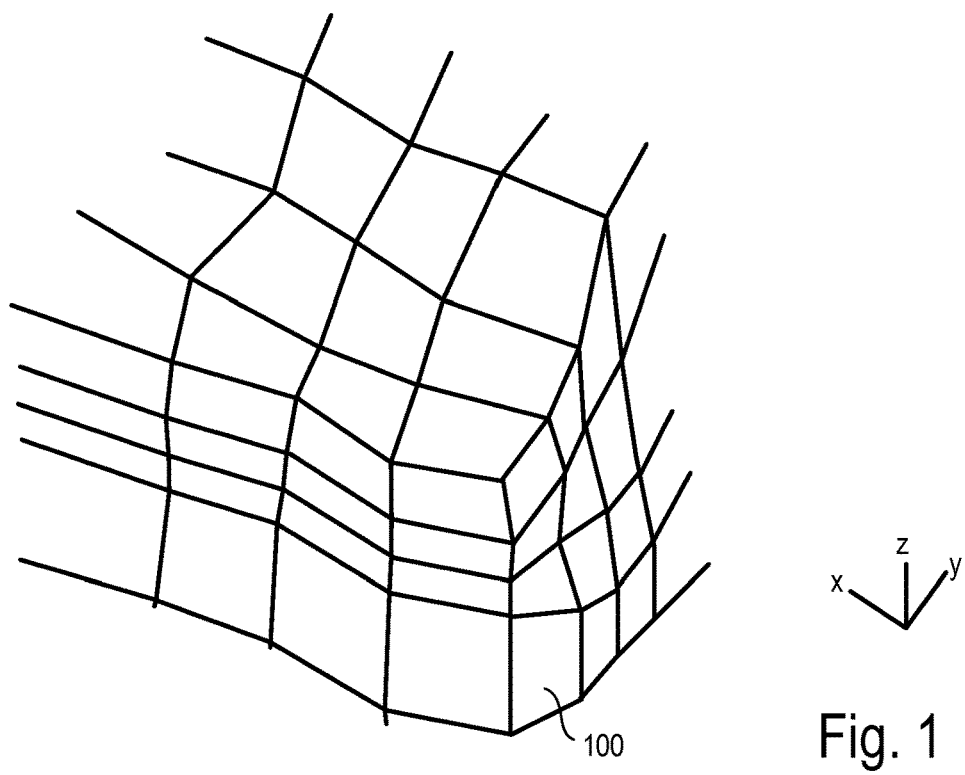
FIG. 1 is a representation of part of a typical reservoir grid.

The reservoir grid is an irregular grid of cells with cell boundaries defined, at least in part, by geologic features of the subsurface. FIG. 1 illustrates a part of such a grid. The grid is fairly irregular in the x and y directions, and is more markedly irregular in the z direction. In particular, the boundary of each cell 100 is defined in the z direction by each layer boundary of the subsurface. In this way, the reservoir grid describes the subsurface geology in terms of the reservoir layers, represented by the various z planes of the reservoir grid.

The reservoir grid is somewhat large and unwieldy due to its irregular nature. To address this, a "hybrid grid" has been devised, which provides a compromise solution between using a seismic dataset regularly sampled in the x,y,z directions and an irregularly sampled reservoir grid. The hybrid grid is regular in the x and y directions, in a similar manner to the seismic grid, while maintaining the irregular layered approach in the z direction of the reservoir grid. In one embodiment the hybrid grid may share the same sampling rate (definition) in the x-y plane as the seismic grid from which it is constructed.

Figure 2:
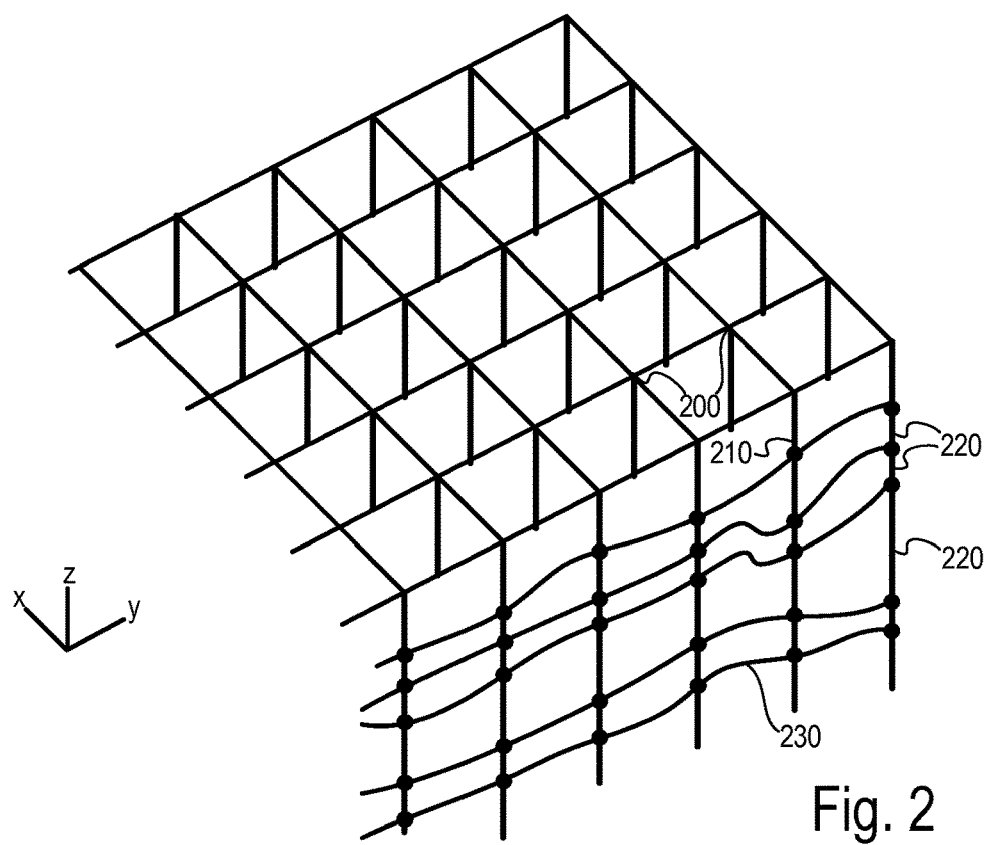
FIG. 2 is a representation of part of a hybrid grid according to an embodiment of the invention, with reservoir grid layering also shown.
Figure 3:
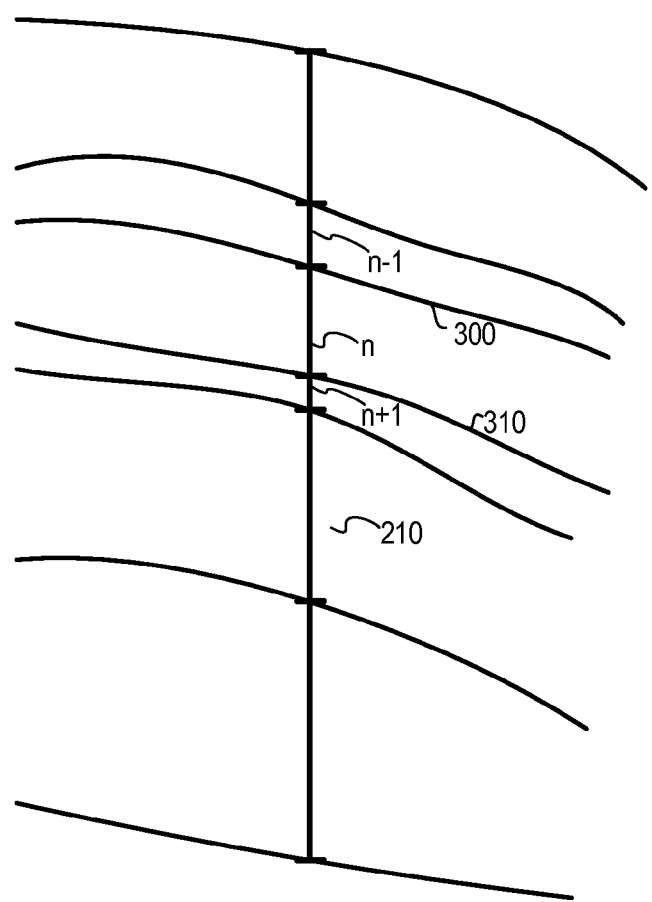
FIG. 3 is an illustration of one pillar of the hybrid grid of FIG. 2 with reservoir grid layering also shown.

FIG. 2 illustrates such a hybrid grid. At each regularly spaced intersection 200 on the x-y plane is a vertical 1D array or "pillar" 210 extending in the z direction (where the z direction is the direction from surface to subsurface). Each pillar is composed of a set of 1D cells 220, each cell having its upper and lower boundaries defined by the layer boundaries 230 (or faults) of the subsurface. The layer boundaries are shown on the diagram for illustration. The top boundary of one cell is the bottom boundary of the cell immediately above and the bottom boundary of one cell is the top boundary of the cell immediately below it. A single pillar 210 is shown in FIG. 3. Here, the top boundary 300 of cell n is the bottom boundary of cell n−1 and the bottom boundary 310 of cell n is the top boundary of cell n+1.

The hybrid grid comprises an array of these vertical pillars. There is no topological link in the hybrid grid other than the link between pillars, that is their positions relative to each other in the x-y plane. In this aspect they are equivalent to 3D datasets. Different pillars within a single hybrid grid may comprise a different number of cells. This can be seen in FIG. 4, which shows two adjacent pillars 400a, 400b. Pillar 400a is comprised of 6 cells and pillar 400b is comprised of 5 cells.

A hybrid grid cell may comprise a number of properties (cell centered) in a similar manner to a reservoir grid. Some properties may be of Boolean type with the cell having a true or false value for this property, which is hence called a region.

Figure 5:
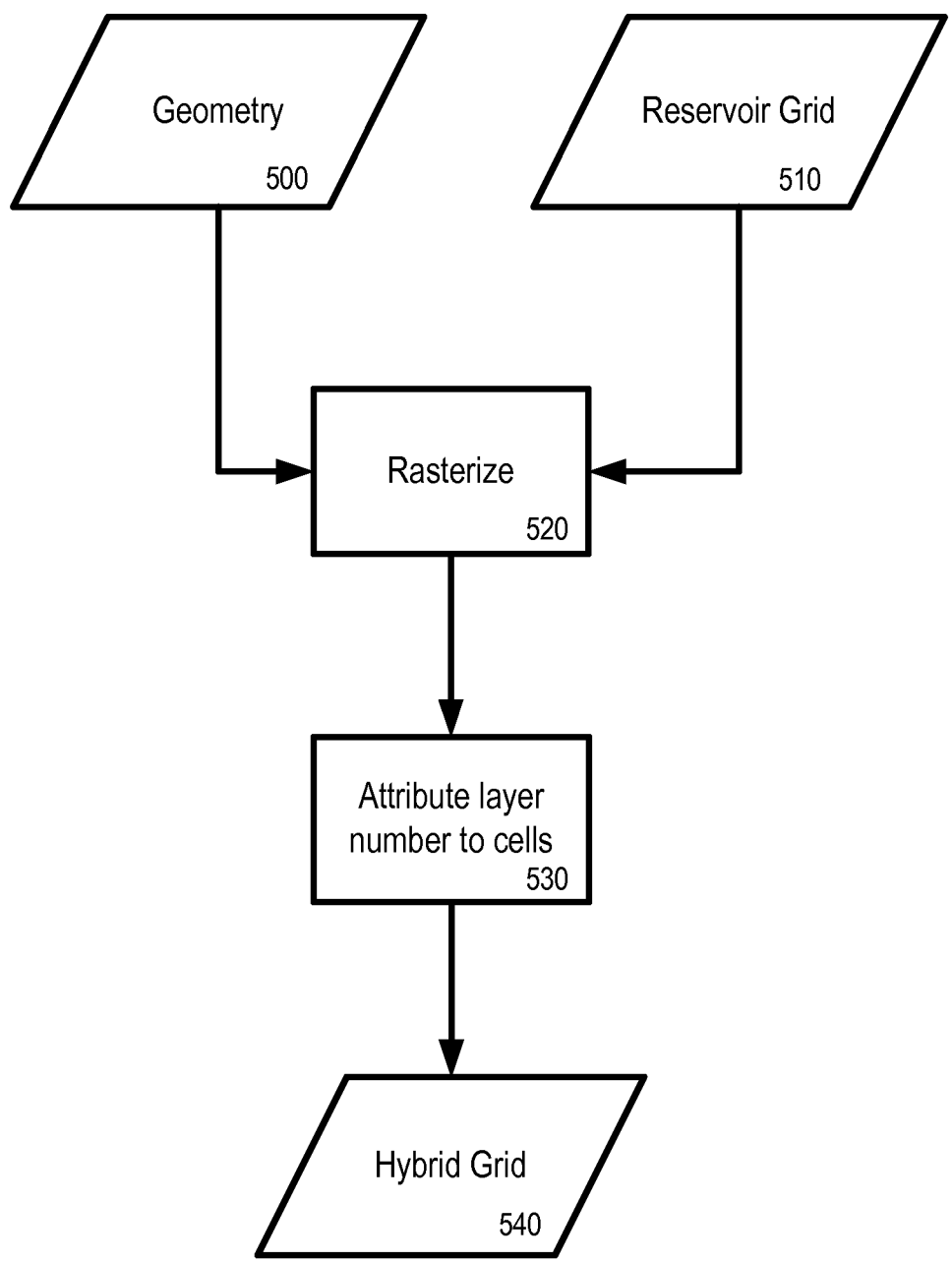
FIG. 5 is a flow diagram illustrating a method of constructing the hybrid grid of FIG. 2.

FIG. 5 is a flowchart illustrating how a hybrid grid can be created from a geometry 500 (origin, unit vector in the x,y dimensions, step in x,y dimensions) and a reservoir grid 510. In this case a rasterization of the reservoir grid is performed 520 in order to construct the pillars. To do this, a layer property is created in the hybrid grid. The layer property comprises attributing to each cell of the hybrid grid 530, the corresponding layer number of the reservoir grid for that cell. The output of this method is the hybrid grid 540.

The rasterization process 520 consists of determining every intersection through a reservoir layer of the reservoir grid (in the z-direction), at each pillar position (x,y location). A cell is created for the given pillar each time a layer is intersected, the cell being attributed with the appropriate layer number from the reservoir grid.

Figure 4:
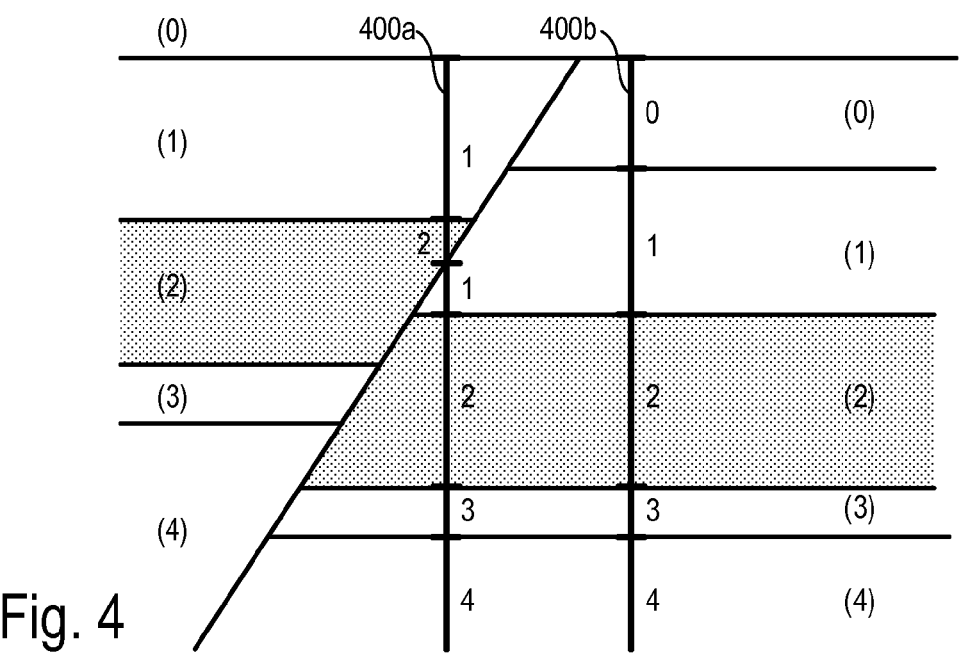
FIG. 4 is an illustration of two pillars of the hybrid grid of FIG. 2 with reservoir grid layering also shown.

As illustrated in FIG. 4, each reservoir layer may be intersected once, more than once, or not at all at a given x,y location. The numbers in parentheses are the reservoir grid layer numbers. The number shown next to each cell is the layer number attributed to that cell. Layer (2) is shown shaded for illustration. In the specific example shown, pillar 400b passes once through each of reservoir layers (0)-(4). Pillar 400a passes through reservoir layers (1) and (2) twice, through reservoir layers (3) and (4) once and does not pass through layer (0) at all. Consequently, the cell number of the hybrid grid (counting in the z-direction) does not necessarily correspond to the layer number attributed to that cell.

It should be understood that the reservoir grid description illustrated here (with quadrangular cells) is only provided as an example, and any other reservoir grid description (i.e. an unstructured grid) can be used to create a hybrid grid provided that the notion of layers exists.

It should also be understood that the hybrid grid could be defined either with the pseudo vertical direction as depth or time.

As an alternative to the methodology of FIG. 5, the hybrid grid may be constructed from a regular geometry, a set of horizons (with the number of horizons known) and a number of sedimentological rules attached to the horizons. The sedimentological rules may categorise the horizons according to whether they are "parallel to top", "parallel to base" or "proportional". "Top" and "Base" may refer to the surface and lowermost horizon respectively, or else could refer to one or more reference horizons.

Figure 6:
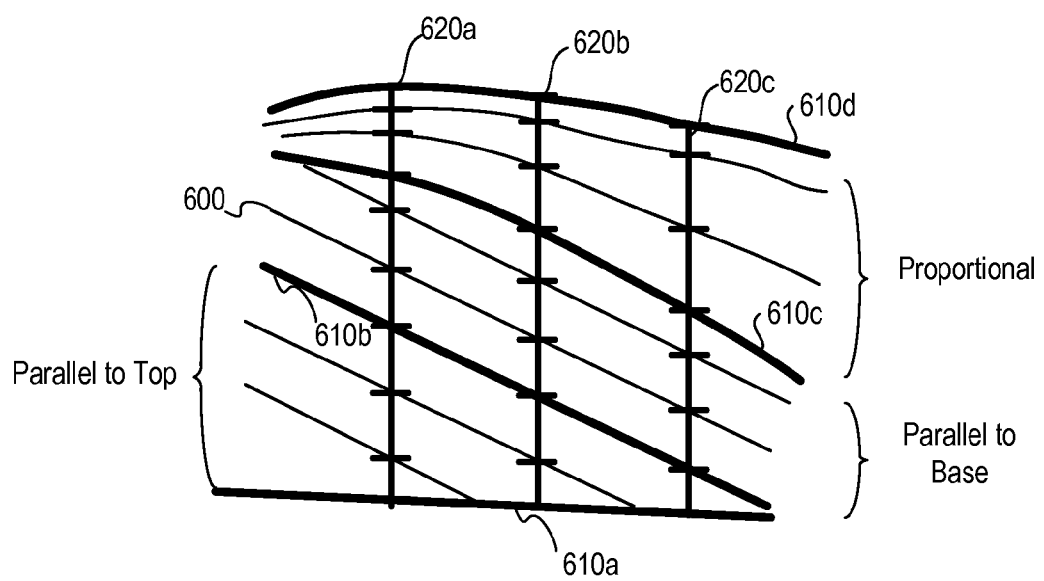
FIG. 6 illustrates a further method of constructing the hybrid grid of FIG. 2.

FIG. 6 illustrates this methodology. It shows a set of horizons, including four reference horizons 610a-610d (shown bold) and sub-horizons 600. The sub-horizons labelled "parallel to top" and "parallel to base" are both referenced to reference horizon 610b. The sub-horizons labelled proportional are referenced to reference horizons 610c and 610d. Three pillars 620a, 620b, 620c of the resultant hybrid grid are also shown.

This method of construction of a hybrid grid is similar to the method already described using a reservoir grid. A main difference is that the layer property is not defined. At each pillar location defined by the regular geometry in the x-y plane, each intersection with the reference horizons 610a-610d is determined. The positions of the sub-horizons between each pair of adjacent ones of these computed intersections is then determined according to the sedimentological rules and the known number of sub-horizons between each pair of reference horizons, thus defining the positions of the cells. This process will be readily apparent to the skilled person.

The hybrid grid is a much smaller object compare to reservoir grid (only pillars and properties are stored) and therefore it can have an extremely high lateral resolution. Compared to seismic cube, the hybrid grid has the advantage of retaining the layer notion, which is the most important geological feature. Any kind of fault can be handled without difficulty.

The hybrid grid (in the time domain) is a good support for seismic inversion. It can be used to parameterize the inversion, which means that the inversion results can be directly attributed to each identified layer of the hybrid grid. To transfer the inversion results to the reservoir grid (in depth) there is no need for a time to depth conversion: as all that is needed is to attribute the value for a layer from the hybrid grid to the corresponding layer in the reservoir grid. However, as the seismic data is generally coarser (in the z/time direction) than the reservoir/hybrid grid, two or more adjacent layers of the hybrid grid may be collapsed in a single layer for the sake of the inversion. If so, it is necessary to distribute the inversion results obtained at the coarse layer to the finer layers of the reservoir grid.

The construction of the original hybrid grid either from a reservoir grid or from a set of layers generally results in a smooth version of the hybrid grid. During the inversion, it is possible to adapt the layer thicknesses of the hybrid grid to match the actual seismic data. The new information concerning the geometry of the grid can be used to update the geometry of the reservoir grid.

The hybrid grid is also a good support for the loop back problem i.e. regenerating seismic data from a geological model or a reservoir grid. For that purpose, first a hybrid grid is constructed using the reservoir grid. The seismic response can then be computed from the hybrid grid. As a result of the coarse lateral resolution of the reservoir grid, many adjacent cells of the same layer of the hybrid grid will have the same elastic values and therefore many of the computed seismic traces will be the same. Actual seismic response is not pointwise (e.g. Fresnel zone effect) and therefore the response at any given xy position is a mixture of the responses of neighbouring cells. This can be simulated by mean filtering the elastic properties of each layer of the hybrid grid.

The hybrid grid is a good intermediary for transferring information from a seismic dataset to a reservoir grid because it decouples the lateral upscaling the vertical down scaling problem. When converting from seismic data to hybrid grid, only data in the z direction needs to be considered (since the lateral resolution of hybrid grid and seismic is exactly the same). Consequently transferring information from a hybrid grid to reservoir grid requires only lateral upscaling in a layer by layer manner. When converting in the opposite direction the hybrid grid makes it possible to consider in a first step (conversion of a reservoir grid to hybrid grid), only data in the x and y directions; and in a subsequent step to consider only the data in the vertical direction (transfer of information from the hybrid grid to seismic support).

One or more steps of the methods and concepts described herein may be embodied in the form of computer readable instructions for running on suitable computer apparatus, or in the form of a computer system comprising at least a storage means for storing program instructions embodying the concepts described herein and a processing unit for performing the instructions. As is conventional, the storage means may comprise a computer memory (of any sort), and/or disk drive, optical drive or similar. Such a computer system may also comprise a display unit and one or more input/output devices.

The concepts described herein find utility in all aspects of surveillance, monitoring, optimisation and prediction of hydrocarbon reservoir and well systems, and may aid in, and form part of, methods for extracting hydrocarbons from such hydrocarbon reservoir and well systems.

It should be appreciated that the above description is for illustration only and other embodiments and variations may be envisaged without departing from the spirit and scope of the invention.

The invention claimed is:

1. A method of modelling a subsurface reservoir comprising:
    defining a regular planar grid comprising regularly arranged locations, in the two dimensions substantially parallel to the surface;
    calculating a plurality of one dimensional arrays, each one dimensional array extending from a different one of said regularly arranged locations, in the dimension substantially perpendicular to said planar grid;
    wherein each said one dimensional array is a vertical pillar, the plurality of one dimensional arrays is a plurality of said vertical pillars and the only topological link between said vertical pillars of the plurality of vertical pillars comprises their positions relative to each other in the two dimensions substantially parallel to the surface;
    each of said one dimensional arrays comprising a plurality of one dimensional cells, wherein said cells are delineated according to actual geological features of the subsurface reservoir;
    using the plurality of one dimensional arrays as an input to a simulator for predicting one or more physical properties of the reservoir; and
    using the one or more physical properties in a step of extracting hydrocarbons from the reservoir.

2. A method as claimed in claim 1 wherein each of said cells is delineated by subsurface faults and/or upper and lower boundaries of subsurface layers in the dimension substantially perpendicular to the planar grid.

3. A method as claimed in claim 1 wherein each of said cells comprises one or more attributes describing properties of the subsurface reservoir being modelled.

4. A method as claimed in claim 1 wherein said step of calculating a plurality of one dimensional arrays uses a reservoir grid as an input, each layer of the reservoir grid being assigned thereto a unique layer number.

5. A method as claimed in claim 4 comprising the step of attributing to each of said cells: the layer number of the reservoir grid corresponding to that particular cell.

6. A method as claimed in claim 4 wherein said step of calculating a plurality of one dimensional arrays comprises:
    at each of said regularly arranged locations, determining each layer of the reservoir grid traversed in the dimension substantially perpendicular to said planar grid.

7. A method as claimed in claim 4 comprising using said plurality of one dimensional arrays to regenerate seismic data from a geological model or a reservoir grid.

8. A method as claimed in claim 7 comprising the steps of:
    constructing said plurality of one dimensional arrays from said reservoir grid; and
    calculating the seismic response from said plurality of one dimensional arrays.

9. A method as claimed in claim 8 wherein during said step of constructing said plurality of one dimensional arrays from said reservoir grid, only data in the dimensions of said planar grid is considered; and
    during said step of calculating the seismic response from said plurality of one dimensional arrays only the data in the dimension perpendicular to the planar grid is considered.

10. A method as claimed in claim 7 comprising mean filtering the elastic properties of each layer of the one dimensional arrays prior to regeneration of the seismic data.

11. A method as claimed in claim 1 wherein said step of calculating a plurality of one dimensional arrays uses as an input, a set of horizons and a number of sedimentological rules describing how the horizons are interrelated.

12. A method as claimed in claim 11 wherein said sedimentological rules describe how groups of horizons with similar properties are related to one or more reference horizons.

13. A method as claimed in claim 12 wherein said step of calculating a plurality of one dimensional arrays comprises:
    at each of said regularly arranged locations, determining each intersection with a reference horizon; and
    determining the positions of the other horizons based on said sedimentological rules and the known number of horizons.

14. A method as claimed in claim 11 wherein the method further comprises using said plurality of one dimensional arrays in a seismic inversion.

15. A method as claimed in claim 14 wherein said plurality of one dimensional arrays is used to parameterise the inversion.

16. A method as claimed in claim 14 wherein the method further comprises directly attributing inversion results to each identified layer of the grid of one dimensional arrays.

17. A method as claimed in claim 14 wherein the method further comprises adapting the layer thicknesses of the plurality of one dimensional arrays to match those of the actual seismic data during the inversion.

18. A method as claimed in claim 11 comprising the steps of:
    constructing said plurality of one dimensional arrays from seismic data; and
    constructing a reservoir grid from said plurality of one dimensional arrays.

19. A method as claimed in claim 18 wherein during said step of constructing said plurality of one dimensional arrays from the seismic data, only data in the dimension perpendicular to the planar grid is considered; and
    during said step of constructing a reservoir grid from said plurality of one dimensional arrays only the data in the dimensions of said planar grid is considered.

20. A system including a computer apparatus and a computer program which, when executed on the computer apparatus, causes the computer apparatus to perform the method of claim 1.

21. A method as claimed in claim 1 wherein the step of calculating a plurality of one dimensional arrays comprises attributing a varying number of cells to different said vertical pillars of the plurality of vertical pillars depending on the actual geological features of the subsurface reservoir.

* * * * *